United States Patent
Hamada et al.

(10) Patent No.: US 10,097,116 B2
(45) Date of Patent: Oct. 9, 2018

(54) MOTOR CONTROL APPARATUS FOR CONTROLLING MOTOR BASED ON COUNTER-ELECTROMOTIVE VOLTAGE GENERATED IN WINDING OF MOTOR

(71) Applicant: CANON KABUSHIKI KAISHA, Tokyo (JP)

(72) Inventors: Shuhei Hamada, Nagareyama (JP); Kota Kiyama, Kawasaki (JP); Masaaki Naoi, Yokosuka (JP); Toru Miyazawa, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 15/258,136

(22) Filed: Sep. 7, 2016

(65) Prior Publication Data

US 2017/0077850 A1    Mar. 16, 2017

(30) Foreign Application Priority Data

Sep. 11, 2015 (JP) .................................. 2015-180113
Jul. 22, 2016 (JP) .................................. 2016-144754

(51) Int. Cl.
  *H02P 21/24* (2016.01)
  *H02P 6/17* (2016.01)
  *H02P 6/182* (2016.01)

(52) U.S. Cl.
  CPC ............... *H02P 6/182* (2013.01); *H02P 6/17* (2016.02); *H02P 21/24* (2016.02)

(58) Field of Classification Search
  CPC .. H02P 6/182; H02P 21/24; H02P 6/17; H02P 23/00; H02P 27/04
  See application file for complete search history.

(56) References Cited

U.S. PATENT DOCUMENTS

2007/0252546 A1* 11/2007 Peterson ................. F04B 17/03
                                                                  318/432
2011/0266987 A1* 11/2011 Markunas ............... H02P 25/03
                                                                  318/400.24

(Continued)

FOREIGN PATENT DOCUMENTS

| JP | 4154149 B | 9/2008 |
| JP | 4631672 B | 2/2011 |
| JP | 5170505 B | 3/2013 |

OTHER PUBLICATIONS

Jeong-seong Kim, S. Doki and M. Ishida, "Improvement of IPMSM sensorless control performance by suppression of harmonics on the vector control using Fourier transform and repetitive control," IEEE 2002 28th Annual Conference of the Industrial Electronics Society. IECON 02, 2002, pp. 597-602 vol. 1 . <URL: http://ieeexplore.ieee.org/stamp/stamp.jsp?tp.*

Primary Examiner — Eduardo Colon Santana
Assistant Examiner — Said Bouziane
(74) Attorney, Agent, or Firm — Fitzpatrick, Cella, Harper & Scinto

(57) ABSTRACT

A motor control apparatus includes: a unit configured to determine a counter-electromotive voltage in a winding of a motor; a unit configured to determine a rotational position of a rotor of the motor based on the counter-electromotive voltage; a unit configured to determine a first velocity of the rotor, based on change in the rotational position; a correction unit configured to obtain a second velocity by correcting the first velocity based on a harmonic component included in the first velocity; and a driving unit configured to drive the motor based on the second velocity and the rotational position. The correction unit includes a unit configured to obtain the second velocity by reducing error in the first velocity that occurs due to the harmonic component.

15 Claims, 14 Drawing Sheets

(56) References Cited

U.S. PATENT DOCUMENTS

2014/0139174 A1\* 5/2014 Shi .................... H02P 23/14
   318/727
2015/0158396 A1\* 6/2015 Walters ................ H02P 6/16
   701/22

\* cited by examiner

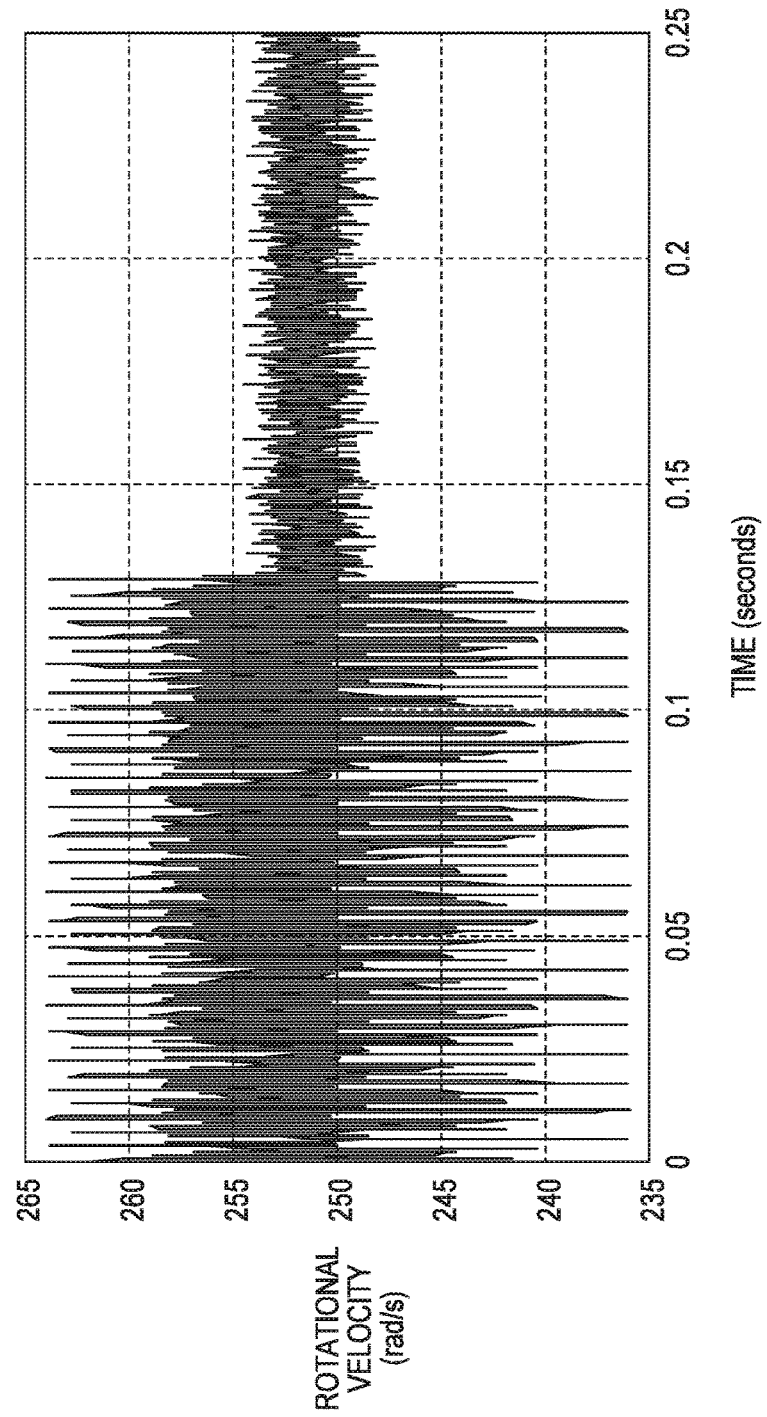

MOTOR CONTROL APPARATUS FOR CONTROLLING MOTOR BASED ON COUNTER-ELECTROMOTIVE VOLTAGE GENERATED IN WINDING OF MOTOR

BACKGROUND OF THE INVENTION

Field of the Invention

The present invention relates to a motor control apparatus for controlling a motor.

Description of the Related Art

A permanent magnet motor (hereinafter referred to simply as a "motor" as well) is excellent for achieving a compact size and higher efficiency, and is used as a drive unit in various fields, including the field of information devices such as printers and copiers. When vector control is used as motor control, torque generated in the motor can be controlled more precisely, and it is possible to realize noise reduction, vibration reduction, and higher efficiency in the motor. Rotational position information regarding a rotor of the motor is needed in vector control. For this reason, in general, a position sensor such as a Hall element or an encoder is used, which leads to increases in cost and size.

In view of this, a sensor-less method has been proposed in which the rotational position of the rotor is estimated based on current flowing in the motor without using a position sensor. One example of a sensor-less method is a counter-electromotive voltage estimation method, in which the rotational position of the rotor is estimated by estimating counter-electromotive voltages generated in the windings of the motor accompanying the rotation of the rotor. The counter-electromotive voltages generated in the windings of the motor are determined according to the magnetization distribution of the permanent magnets in the rotor. The magnetization distribution of the permanent magnets is often a trapezoidal wave magnetization in order to achieve higher efficiency in the motor. Harmonic components, which are integral multiples of the rotation frequency of the motor, are included in the counter-electromotive voltage generated in the winding of the motor with the trapezoidal wave magnetization. Also, even in the case of magnetizing with a sine waveform, an ideal sine wave is not achieved due to errors in manufacturing, and harmonic components are included in the counter-electromotive voltage. With the counter-electromotive voltage estimation method, the rotational position of the rotor is estimated under the assumption that the counter-electromotive voltage normally changes in a sine waveform, and therefore error occurs due to the harmonic components.

For this reason, Japanese Patent No. 5170505 discloses a configuration in which the harmonic components are removed using a low-pass filter, whereby the error in the estimated position is reduced. Also, Japanese Patent No. 4154149 discloses a configuration in which a table of data on the counter-electromotive voltage of a motor is prepared, and a voltage is applied to the motor with consideration given to the harmonic components of the counter-electromotive voltage, whereby the harmonic components are removed. Furthermore, Japanese Patent No. 4631672 discloses a configuration in which harmonic components are extracted using a high-pass filter and a correction amount of the estimated position is obtained based on the extracted harmonic components, whereby the error is reduced.

However, with the configuration disclosed in Japanese Patent No. 5170505, phase lag caused by the low-pass filter occurs, and lag occurs in the estimation of the rotational position and rotational velocity of the rotor. Due to this lag, the responsiveness and stability of the control loop decrease. With the configuration disclosed in Japanese Patent No. 4154149, phase lag does not occur, but in order to obtain the counter-electromotive voltage data, measurement using a dedicated apparatus needs to be performed in advance, which reduces productivity. With the configuration disclosed in Japanese Patent No. 4631672, the extracted harmonic components include harmonic components resulting from counter-electromotive voltage distortion and harmonic components that occur due to velocity variation and load variation, and a distinction cannot be made between these, as a result of which error is included in the correction amount of the calculated rotational position. It is also difficult to eliminate the influence of phase shift caused by the high-pass filter, and error caused by phase shift also occurs.

SUMMARY OF THE INVENTION

According to an aspect of the present invention, a motor control apparatus includes: a counter-electromotive voltage determination unit configured to determine a counter-electromotive voltage that is generated in a winding of a motor; a position determination unit configured to determine a rotational position of a rotor of the motor based on the determined counter-electromotive voltage; a velocity determination unit configured to determine a first velocity, which is a rotational velocity of the rotor, based on change in the rotational position per unit time; a correction unit configured to obtain a second velocity by correcting the first velocity based on a harmonic component included in the first velocity; and a driving unit configured to drive the motor based on the second velocity and the rotational position. The correction unit includes: an extraction unit configured to extract the harmonic component; and an error reduction unit configured to obtain the second velocity by reducing error in the first velocity that occurs due to the harmonic component.

Further features of the present invention will become apparent from the following description of exemplary embodiments with reference to the attached drawings.

BRIEF DESCRIPTION OF THE DRAWINGS

FIG. 9 is a diagram showing an error reduction effect according to an embodiment.

DESCRIPTION OF THE EMBODIMENTS

Hereinafter, exemplary embodiments of the present invention will be described with reference to the drawings. Note that the following embodiments are exemplary and the present invention is not limited to the content of the embodiments. Also, in the following drawings, constituent elements that are not needed in the description of the embodiments are omitted from the drawings.

First Embodiment

Figure 2:
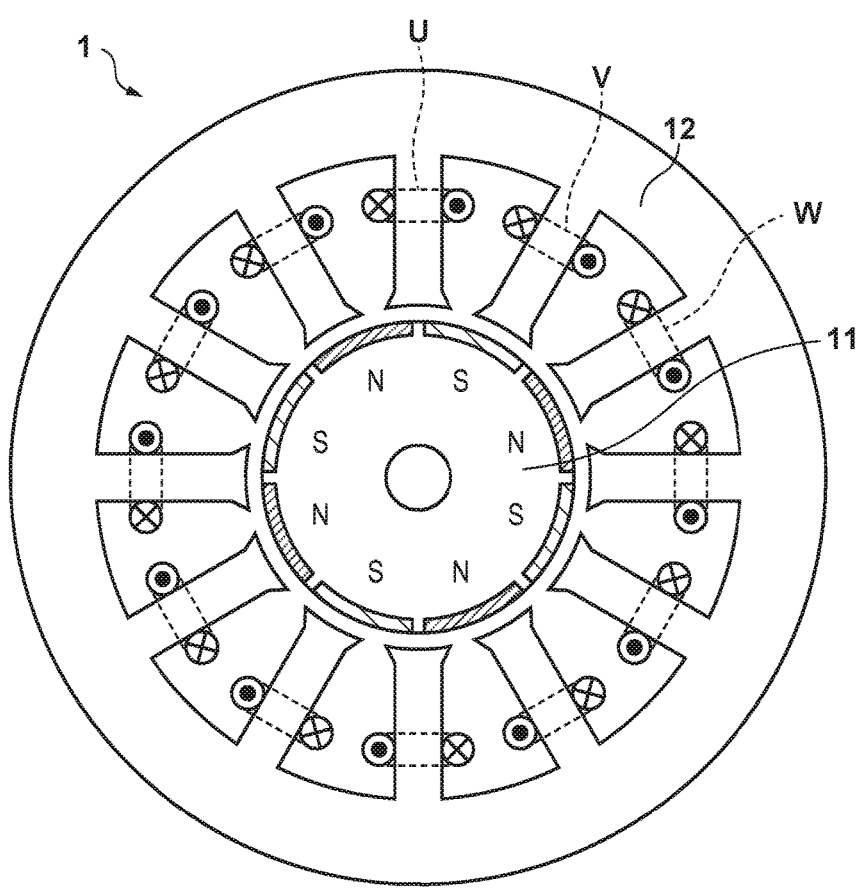
FIG. 2 is a diagram showing a configuration of a motor according to an embodiment.

Hereinafter, the present embodiment will be described using a motor control apparatus that controls a three-phase DC brushless motor with eight poles and twelve slots. Note that the motor controlled by the motor control apparatus of the present invention is not limited to being a three-phase DC brushless motor with eight poles and twelve slots, and for example, the present invention can also be applied to a motor of another type, such as a two-phase stepping motor. FIG. 2 shows a motor 1 of the present embodiment. Note that FIG. 2 is a cross-sectional view of a surface orthogonal to the rotation axis of the motor. The rotor 11 includes an eight-pole (four pairs) permanent magnet. A stator 12 has twelve tooth portions (slots) arranged in 30-degree increments, and windings U, V, and W are wrapped around the slots. Note that the windings U, V, and W are arranged on different slots.

Figure 1:
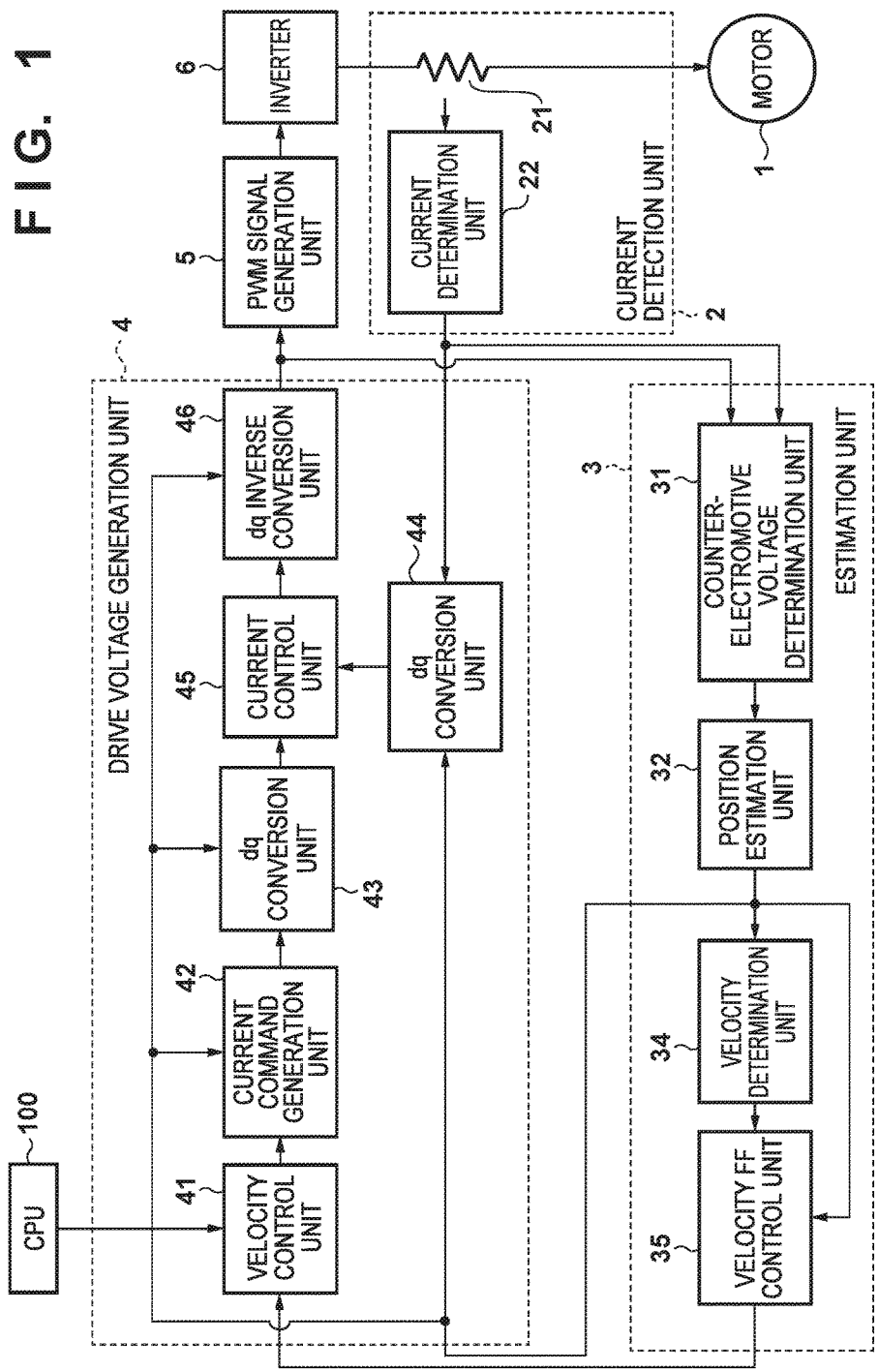
FIG. 1 is a diagram showing a configuration of a motor control apparatus according to an embodiment.

FIG. 1 is a diagram showing an overall configuration of a motor control apparatus according to the present embodiment. A current detection unit 2 detects currents that flow in the windings for the respective phases of the motor 1. Specifically, a current detection resistor 21 is connected in series with the windings for the respective phases of the motor, and the current determination unit 22 determines the currents that flow in the windings for the respective phases of the motor 1 based on the voltage value of the current detection resistor 21. Note that it is possible to use a configuration in which the currents in two of three phases are detected and the current in the remaining phase is obtained by calculation.

As will be described later, the estimation unit 3 outputs the determined (estimated) magnetic pole position θ_est (hereinafter referred to as "estimated position" as well) of the motor 1 and the determined (estimated) rotational velocity (hereinafter referred to as "estimated velocity" as well) Vel_out of the motor 1. First, the counter-electromotive voltage determination unit 31 determines (estimates) the counter-electromotive voltage generated in the motor 1 based on a drive voltage command value input from the drive voltage generation unit 4 and the current detection values for the respective phases input from the current detection unit 2. Specifically, first, the counter-electromotive voltage determination unit 31 uses the following conversion equations to convert the drive voltage command value and the current detection value for each phase into a drive voltage command value and a current detection value in an αβ coordinate system.

$$\begin{bmatrix} V\alpha \\ V\beta \end{bmatrix} = \sqrt{\frac{2}{3}} \times \begin{bmatrix} 1 & -\frac{1}{2} & -\frac{1}{2} \\ 0 & \frac{\sqrt{3}}{2} & -\frac{\sqrt{3}}{2} \end{bmatrix} \times \begin{bmatrix} V_u \\ V_v \\ V_w \end{bmatrix}$$

$$\begin{bmatrix} i\alpha\_det \\ i\beta\_det \end{bmatrix} = \sqrt{\frac{2}{3}} \times \begin{bmatrix} 1 & -\frac{1}{2} & -\frac{1}{2} \\ 0 & \frac{\sqrt{3}}{2} & -\frac{\sqrt{3}}{2} \end{bmatrix} \times \begin{bmatrix} iu\_det \\ iv\_det \\ iw\_det \end{bmatrix}$$

Here, Vα and Vβ are drive voltage command values in an αβ coordinate system, which is a stationary coordinate system, and Vu, Vv, and Vw are the drive voltage command values for the U, V, and W phases. Also, iα_det and iβ_det are current detection values in the αβ coordinate system, and iu_det, iv_det, and iw_det are the current detection values for the U, V, and W phases.

The counter-electromotive voltage determination unit 31 uses the motor voltage current equation indicated below to determine the counter-electromotive voltages in the αβ coordinate system, based on the drive voltage command values and the current detection values in the αβ coordinate system.

$$Vback\alpha = V\alpha - \left(R + L\frac{d}{dt}\right) \times i\alpha\_det$$

$$Vback\beta = V\beta - \left(R + L\frac{d}{dt}\right) \times i\beta\_det$$

In the equations above, Vbackα and Vbackβ are the estimated counter-electromotive voltages for the α phase and the β phase respectively, R is the resistance of the motor, and L is the inductance value of the motor.

The position estimation unit 32 functions as a position determination unit that uses the following equations to determine (estimate) the magnetic pole position θ_est of a rotor of the motor 1 based on the counter-electromotive voltages determined by the counter-electromotive voltage determination unit 31. Since the counter-electromotive voltages are determined using the positional relationship between the rotor 11 and the stator 12, which include permanent magnets, the magnetic pole positions of the motor can be estimated based on the counter-electromotive voltages. Note that the position estimation unit 32 estimates the magnetic pole position θ_est each predetermined amount of time.

$$\theta\_est = a\tan(-Vback\alpha/Vback\beta)$$

The velocity determination unit 34 determines (calculates) the rotational velocity of the motor 1 based on the estimated position θ_est of the motor 1. Specifically, the velocity determination unit 34 obtains the amount of change over the predetermined amount of time in the estimated position θ_est estimated each predetermined amount of time by the position estimation unit 32, and obtains an estimated velocity Vel_est by dividing the amount of change by the predetermined amount of time.

The velocity FF (feed forward) control unit 35 removes the error that is caused by the harmonic components in the counter-electromotive voltage and is included in the estimated velocity Vel_est input from the velocity determination unit 34, and thereby outputs an estimated velocity Vel_out with reduced error. The processing performed by the velocity FF control unit 35 will be described in detail later.

The drive voltage generation unit 4 generates a drive voltage command value to the motor 1 based on the estimated position θ_est and the estimated velocity Vel_out input from the estimation unit 3. First, the velocity control unit 41 calculates a velocity deviation, which is the difference between the estimated velocity Vel_out input from the velocity FF control unit 35 and the velocity command value input from CPU 100. Also, the velocity control unit 41 performs PI control on the calculated velocity deviation to output an amplitude command value Iamp of the current for causing the motor 1 to generate a rotation torque. Note that the signs of the velocity command value and the amplitude command value correspond to the rotation direction of the motor 1. CPU 100 also functions as a master controller which outputs the velocity command value.

The current command generation unit 42 uses the following equations to output current command values Iu_order, Iv_order, and Iw_order for the respective phases based on the amplitude command value Iamp input from the velocity control unit 41 and the estimated position θ_est output by the position estimation unit 32.

$$\begin{bmatrix} \text{Iu\_order} \\ \text{Iv\_order} \\ \text{Iw\_order} \end{bmatrix} = \text{Iamp} \times \begin{bmatrix} \sin(\theta\_\text{est}) \\ \sin\left(\theta\_\text{est} - \frac{2\pi}{3}\right) \\ \sin\left(\theta\_\text{est} + \frac{2\pi}{3}\right) \end{bmatrix}$$

The dq conversion unit 43 uses the following equations to convert the current command values for the respective phases into current command values iα_order and iβ_order in the αβ coordinate system, which is a stationary coordinate system. Then, the dq conversion unit 43 subsequently uses the following equation to obtain the current command values id_order and iq_order in the dq coordinate system, which is a rotating coordinate system, based on the current command values in the αβ coordinate system.

$$\begin{bmatrix} i\alpha\_\text{order} \\ i\beta\_\text{order} \end{bmatrix} = \sqrt{\frac{2}{3}} \times \begin{bmatrix} 1 & -\frac{1}{2} & -\frac{1}{2} \\ 0 & \frac{\sqrt{3}}{2} & -\frac{\sqrt{3}}{2} \end{bmatrix} \times \begin{bmatrix} \text{iu\_order} \\ \text{iv\_order} \\ \text{iw\_order} \end{bmatrix}$$

$$\begin{bmatrix} \text{id\_order} \\ \text{iq\_order} \end{bmatrix} = \begin{bmatrix} \cos\theta\_\text{est} & -\sin\theta\_\text{est} \\ \sin\theta\_\text{est} & \cos\theta\_\text{est} \end{bmatrix} \times \begin{bmatrix} i\alpha\_\text{order} \\ i\beta\_\text{order} \end{bmatrix}$$

The dq conversion unit 44 includes a function similar to that of the dq conversion unit 43 and converts the current detection values iu_det, iv_det, and iw_det for the respective phases input from the current detection unit 2 into the current detection values id_det and iq_det in the dq coordinate system. The current control unit 45 calculates current deviations, which are the differences between the current command values id_order and iq_order input from the dq conversion unit 43 and the current detection values id_det and iq_det input from the dq conversion unit 44. Also, the current control unit 45 performs PI control on the calculated current deviations to output the drive voltage command values Vd and Vq of the motor in the dq coordinate system.

A dq inverse conversion unit 46 uses the following equation to convert the drive voltage command values Vd and Vq in the dq coordinate system input from the current control unit 45 into the drive voltage command values Vu, Vv, and Vw for the respective phases.

$$\begin{bmatrix} V_u \\ V_v \\ V_w \end{bmatrix} = \sqrt{\frac{2}{3}} \times \begin{bmatrix} 1 & 0 \\ -\frac{1}{2} & \frac{\sqrt{3}}{2} \\ -\frac{1}{2} & -\frac{\sqrt{3}}{2} \end{bmatrix} \times \begin{bmatrix} V\alpha \\ V\beta \end{bmatrix}$$

Figure 3A:
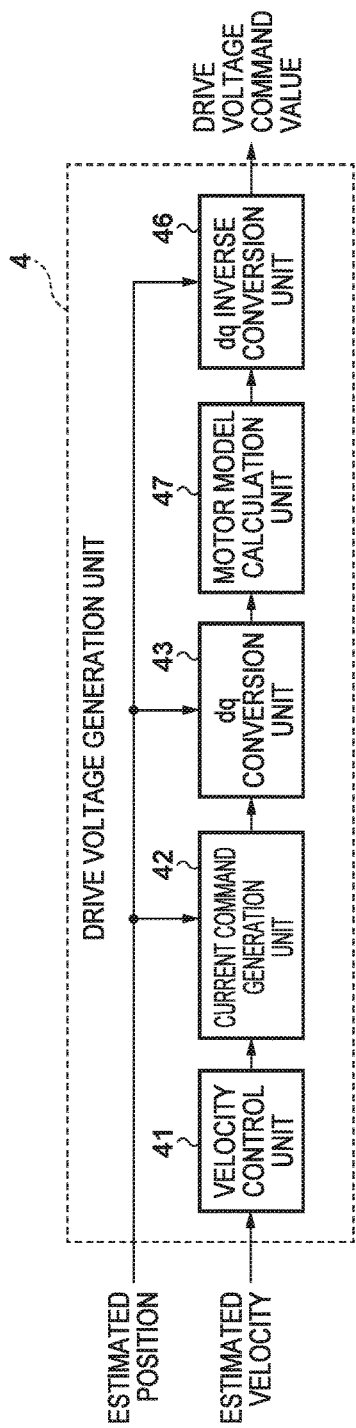
FIGS. 3A and 3B are diagrams showing a configuration of a drive voltage generation unit according to an embodiment.
Figure 3B:
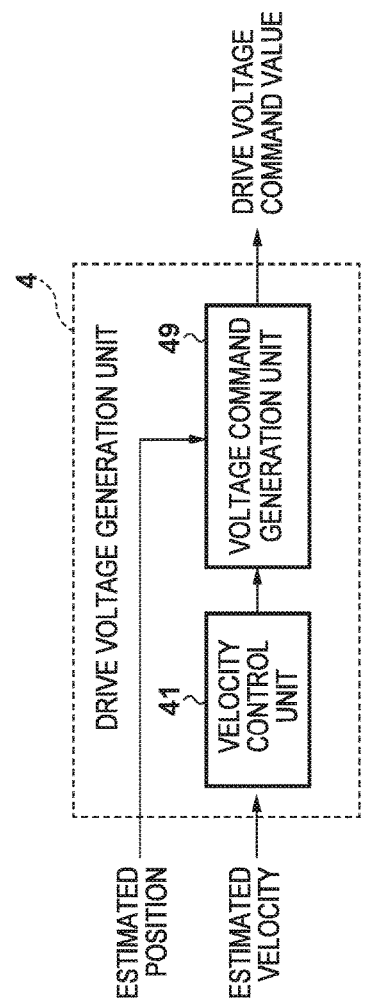

Note that the drive voltage generation unit 4 in the present embodiment has a current feedback control configuration in which the current detection values are used, but the present invention is not limited to this configuration. For example, as shown in FIG. 3A, it is possible to use a configuration in which instead of using the current detection values, the motor model calculation unit 47 generates the drive voltage command values using the current command values and the motor basic equation. Alternatively, it is possible to use a configuration in which the velocity control unit 41 calculates the drive voltage amplitude, and the voltage command generation unit 49 generates the drive voltage command value based on the drive voltage amplitude and the estimated position.

Returning to FIG. 1, the PWM signal generation unit 5 outputs pulse width modulation signals (PWM signals) corresponding to the drive voltage command values Vu, Vv, and Vw. The inverter 6 is driven by the input PWM signals, and AC voltages corresponding to the drive voltage command values Vu, Vv, and Vw are applied to the windings U, V, and W for the respective phases.

Figure 4:
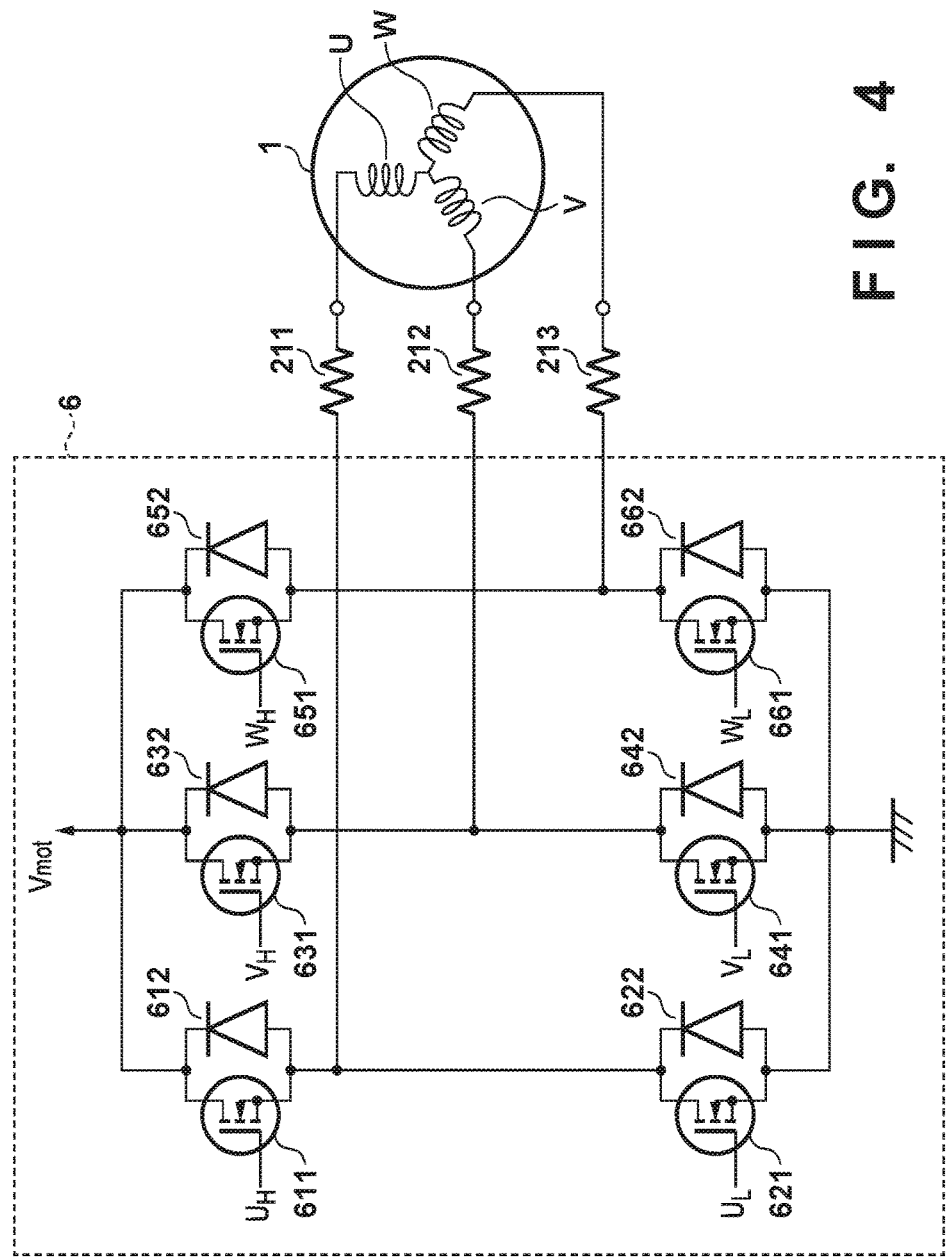
FIG. 4 is a diagram showing a configuration of a connection between an inverter and a motor according to an embodiment.

FIG. 4 shows a configuration of a connection between the inverter 6 and the motor 1. The inverter 6 includes six FETs 611, 621, 631, 641, 651, and 661, and six diodes 612, 622, 632, 642, 652, and 662. The FETs are driven by the PWM signals from the PWM signal generation unit 5. The diodes 612, 622, 632, 642, 652, and 662 are circulation diodes. The outputs of the inverters are provided in correspondence with the respective phases, and are connected to the coils U, V, and W of the motor 1 via the current detection resistors 211, 212, and 213 for the respective phases. Note that the current detection resistor 21 shown in FIG. 1 is a collective name for the current detection resistors 211, 212, and 213 in FIG. 4.

Figure 5A:
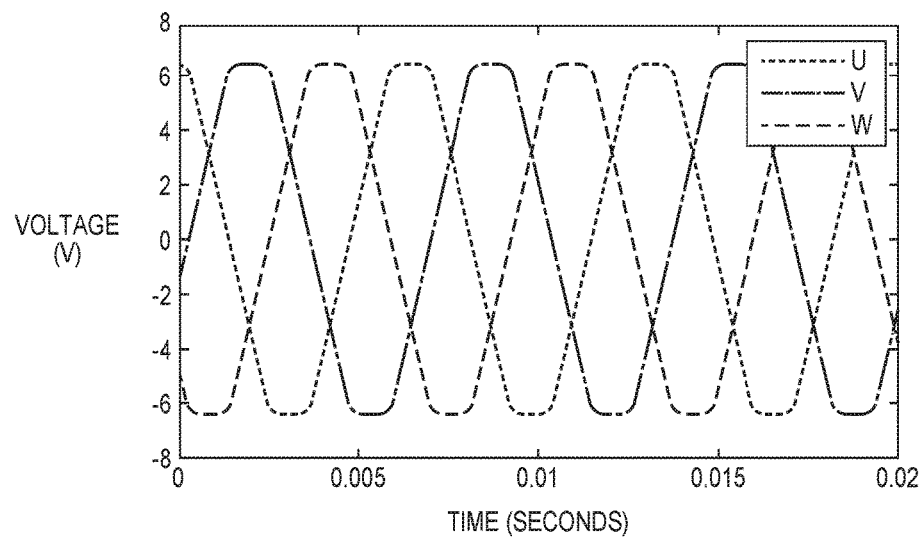
FIGS. 5A and 5B are diagrams illustrating a counter-electromotive voltage according to an embodiment.
Figure 5B:
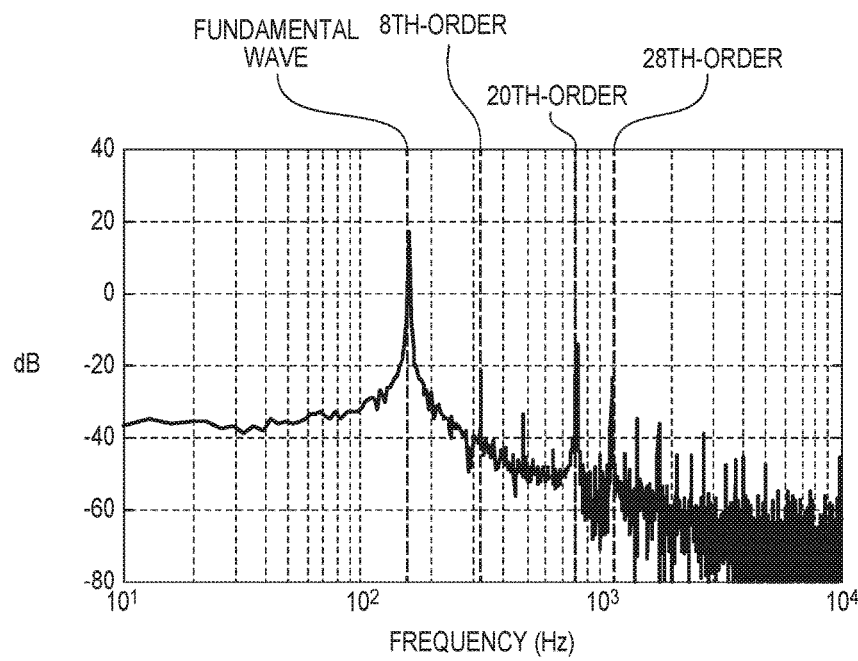
Figure 6A:
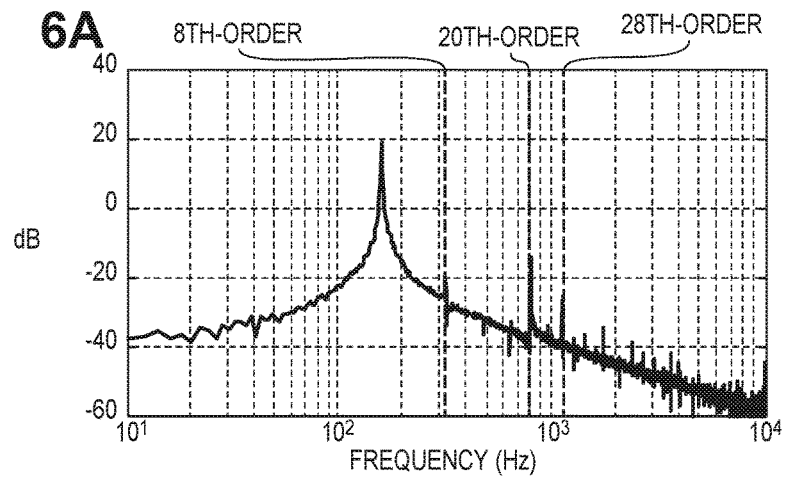
FIGS. 6A to 6C are diagrams illustrating an estimated counter-electromotive voltage, an estimated position, and an estimated velocity, according to an embodiment.
Figure 6B:
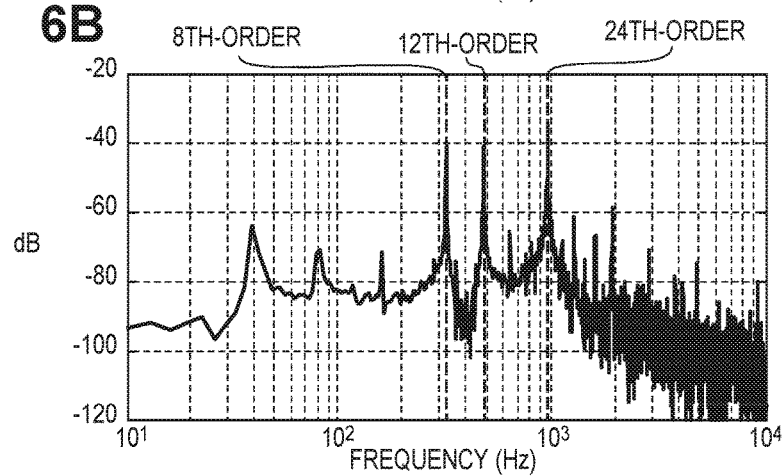
Figure 6C:
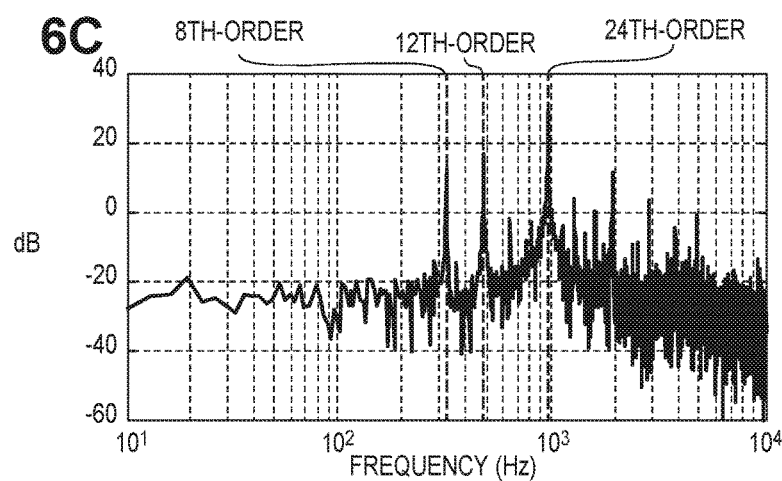

The velocity FF control unit 35 will be described in detail next. As described above, the role of the velocity FF control unit 35 is to reduce the error that is caused by the harmonic components in the counter-electromotive voltage and is included in the estimated velocity Vel_est determined (estimated) by the velocity determination unit 34, and thereby obtain a rotational velocity with reduced error. First, the error included in the estimated velocity Vel_est input from the velocity determination unit 34 will be described with reference to FIGS. 5A and 5B and FIGS. 6A to 6C. Note that FIGS. 5A and 5B are diagrams illustrating a counter-electromotive voltages that are generated in the motor 1, and FIGS. 6A to 6C are diagrams illustrating the estimated counter-electromotive voltages, estimated positions, and estimated velocities.

When the rotor 11 rotates, the interlinkage magnetic fluxes of the windings of the stator 12 change and voltages are generated according to Faraday's law of magnetic inductance, which is expressed in the function below. The voltage is counter-electromotive voltage Vback.

$$Vback = -N \times \frac{d}{dt}\Phi$$

Note that in the above equation, N is the number of turns of the winding, t is the time, and φ is the interlinkage magnetic flux of the winding.

With a common small motor for industrial use, trapezoidal waveform magnetization is often used as the magnetization of the rotor 11 in order to increase efficiency. Accordingly, when the rotor 11 rotates, the interlinkage magnetic flux of the winding is converted into a trapezoidal waveform, and a harmonic component is included in the counter-electromotive voltage in addition to the fundamental wave component. FIG. 5A shows counter-electromotive voltages that are generated when the motor 1 rotates at 40 rps. As shown in FIG. 5A, the counter-electromotive voltage has a shape similar to a trapezoid. FIG. 5B shows the result of performing frequency analysis on the counter-electromotive voltage waveform shown in FIG. 5A. As shown in FIG. 5B, the fundamental wave component and multiple harmonic components are included in the counter-electromotive voltage. In the present example, the motor 1 has an eight-pole twelve-slot structure, and the frequency of the fundamental wave is a frequency equal to four times the motor rotational velocity, or in other words, 40×4=160 Hz. The main frequencies of the harmonic components are the 8th order of the rotation frequency (40×8=320 Hz), the 20th order of the rotation frequency (40×20=800 Hz), the 28th order of the rotation frequency (40×28=1120 Hz), and the like.

If harmonic components are included in the counter-electromotive voltages generated in the windings of the motor 1, harmonic components are also included in the counter-electromotive voltages determined by the counter-electromotive voltage determination unit 31. FIG. 6A shows the result of performing frequency analysis on the counter-electromotive voltage of the α axis determined by the counter-electromotive voltage determination unit 31. As shown in FIG. 6A, 8th-order, 20th-order, and 28th-order harmonic components are included, similarly to the counter-electromotive voltage that is actually generated. Note that the same follows for the β axis as well.

The position estimation unit 32 estimates the estimated position of the magnetic pole under the assumption that the counter-electromotive voltage is a sine wave. Accordingly, if harmonic components are included in the determined counter-electromotive voltage, error caused by the harmonic components will occur in the estimated position of the magnetic pole. FIG. 6B shows the result of performing frequency analysis on the error in the estimated position output by the position estimation unit 32, or in other words, the difference between the estimated position and the actual magnetic pole position. As shown in FIG. 6B, the error in the 8th-, 12th- and 24th-order harmonics is included in the estimated position.

FIG. 6C shows the result of performing frequency analysis on the error included in the estimated velocity obtained by the velocity determination unit 34. As shown in FIG. 6C, the error in the 8th-, 12th-, and 24th-order harmonics is included in the estimated velocity, similarly to the estimated position. Thus, if the harmonic components are included in the counter-electromotive voltages generated in the windings of the motor, error caused by the harmonic components included in the counter-electromotive voltages appears in the estimated values of the magnetic pole position and the rotational velocity of the motor.

The amplitude of the fundamental wave component and the harmonic component included in the counter-electromotive voltage generated in the windings of the motor is proportional to the rotational velocity of the motor. Therefore the error caused by the harmonic component included in the estimated velocity is proportional to the rotational velocity of the motor. Note that since the amplitudes of the fundamental wave component and the harmonic components increase together in proportion to the rotational velocity, the proportion of the amplitudes of the fundamental wave and the harmonics does not change, even if the rotational velocity changes. Accordingly, the error included in the magnetic pole position estimated by the position estimation unit 32 does not change according to the rotational velocity of the motor. Note that the frequency of the harmonics is proportional to the rotational velocity of the motor, and the velocity determination unit 34 determines the rotational velocity according to temporal change in the estimated position, and therefore the error included in the estimated velocity Vel_est is proportional to the rotational velocity.

Figure 7:
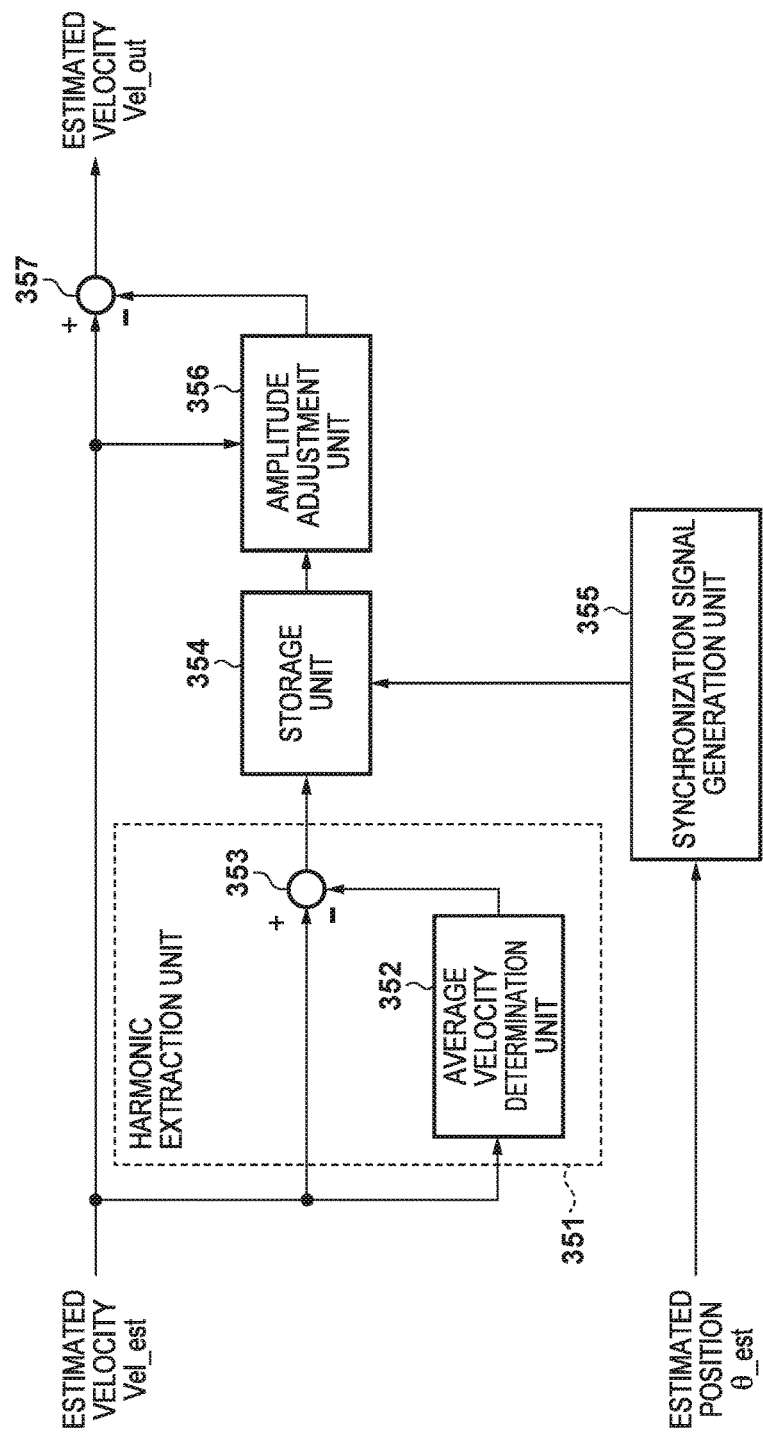
FIG. 7 is a diagram showing a configuration of a velocity FF control unit according to an embodiment.

Next, processing performed by the velocity FF control unit 35 will be described. FIG. 7 is a diagram showing a configuration of the velocity FF control unit 35. The harmonic extraction unit 351 functions as an extraction unit that extracts the error that is caused by the harmonic components in the counter-electromotive voltage and is included in the estimated velocity Vel_est. Specifically, the average velocity determination unit 352 calculates the average velocity of the estimated velocity Vel_est. A subtractor 353 extracts the error in the estimated velocity that occurs due to the harmonic components in the counter-electromotive voltage by subtracting the average velocity from the estimated velocity Vel_est.

The error in the estimated velocity caused by the harmonic components in the counter-electromotive voltage is related to the rotational position of the motor. Accordingly, the storage unit 354 stores the error in the estimated velocity that occurs due to the harmonic components and is output from the harmonic extraction unit 351, in the storage unit in association with the estimated position. The error caused by the harmonic components is included in the estimated position output from the position estimation unit 32. A synchronization signal generation unit 355 reduces the error included in the input estimated position using a phase lock loop (PLL) and outputs the estimated position with the reduced error. Due to the influence of the PLL, phase lag appears in the position signal, but since the phase lag is a constant value, it is not problematic. Note that it is also possible to use a low-pass filter instead of PLL.

The storage unit 354 stores the error in the estimated velocity that occurs due to the harmonic components and is output from the harmonic extraction unit 351, in the storage unit in association with the estimated position with the error reduced by the synchronization signal generation unit 355.

Figure 8A:
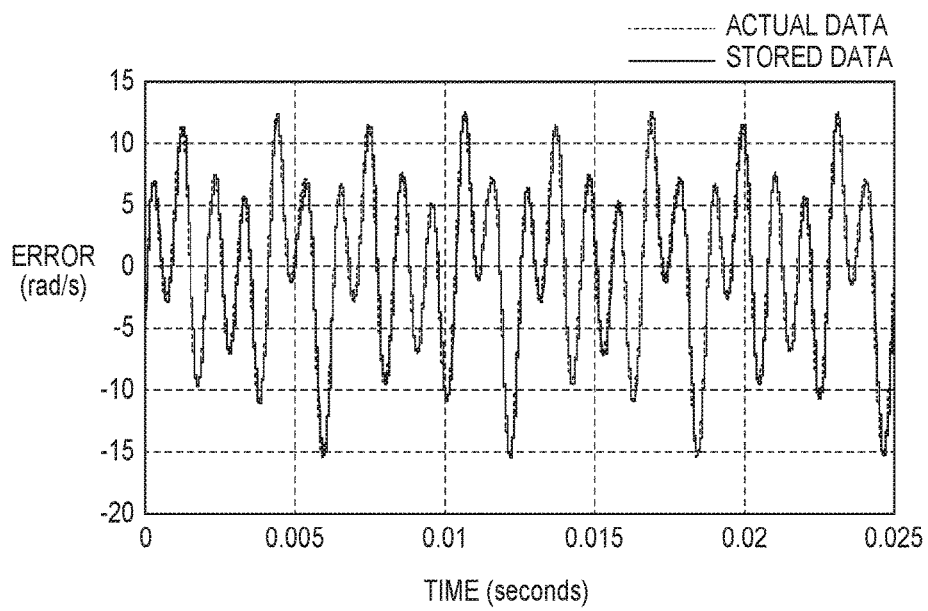
FIGS. 8A and 8B are diagrams showing error extracted by a harmonic extraction unit, according to an embodiment.
Figure 8B:
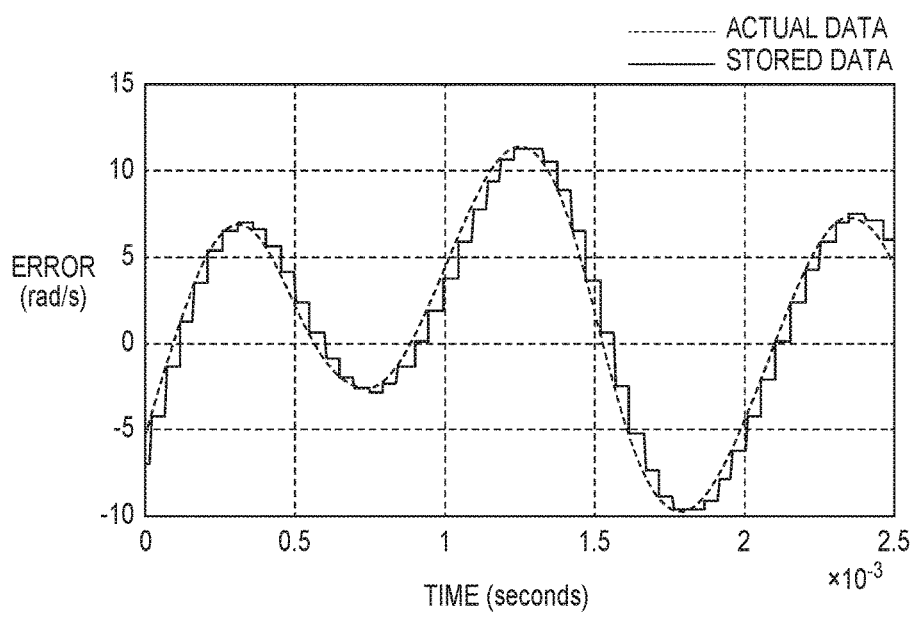

The storage unit 354 is a storage unit that stores the error input from the harmonic extraction unit 351 in association with the position signal input from the synchronization signal generation unit 355. FIG. 8A shows a graph showing error obtained by subtracting the average velocity from the estimated velocity Vel_est (actual data) and the error stored in the storage unit 354 (storage data), and FIG. 8B is an enlarged view of FIG. 8A.

The amplitude adjustment unit 356 adjusts the error input from the storage unit 354 based on the estimated velocity Vel_est. As described before, the error included in the estimated velocity is proportional to the rotational velocity. For this reason, a value obtained by dividing the average value of the estimated velocity by a storing execution velocity is multiplied by the error, and thereby the value of the error can be adjusted to be a value that corresponds to the rotational velocity. Here, the storing execution velocity is a rotational velocity of the motor 1 at which the storing operation of the harmonic component is initiated. Note that it is possible to use a target velocity or the like instead of the average value of the estimated velocity. A harmonic removal unit 357 functions as an error reduction unit that outputs an estimated velocity Vel_out in which error has been reduced by subtracting the error input from the amplitude adjustment unit 356 from the estimated velocity Vel_est input from the velocity determination unit 34. Note that the subtraction is performed in synchronization with the corresponding estimated position. That is, error to be subtracted from the estimated velocity at a certain position is the error at that position. Similarly, the velocity FF control unit 35 functions as a correction unit that extracts the harmonic components included in the estimated velocity Vel_est, corrects the estimated velocity Vel_est based on the extracted harmonic component, and outputs the corrected estimated velocity Vel_out.

FIG. 9 shows the effect of the velocity FF control unit 35. In FIG. 9, the operation of the velocity FF control unit 35 is stopped in the period from 0 seconds to 0.125 seconds, and the velocity FF control unit 35 is allowed to operate in the period from 0.125 seconds to 0.25 seconds. In FIG. 9, it is understood that the error that is caused by the harmonics in the counter-electromotive voltage and is included in the estimated velocity has been reduced by the velocity FF control unit 35. The effect of the reduction of the error by the velocity FF control unit 35 is determined according to the accuracy of extracting the harmonic components. The conditions for increasing the accuracy of extracting the harmonic components will be described hereinafter.

If the control gain of the velocity control in the feedback control is large, the motor follows the error in the estimated velocity, the harmonic components included in the estimated velocity appear to become smaller, and the error cannot be extracted accurately. For this reason, when the harmonic components are to be extracted, it is efficient to perform the extraction with the control gain of the feedback control made smaller than in the case of not extracting the harmonic components. Also, if there is a large load variation on the motor shaft, many frequency components other than the error caused by the harmonic components will be included in the estimated velocity and the error cannot be accurately extracted. For this reason, when the harmonic components are to be extracted, it is efficient to make the load variation on the motor shaft smaller than in the case of not extracting the harmonic components. For example, if there are multiple loads being driven by the motor, it is possible to use a configuration in which all of the loads or at least one of the loads is disconnected by using a clutch or the like. In other words, a driving force by the motor is not transferred to all of the loads or at least one of the loads. Furthermore, if the rotational velocity of the motor is large, motor responsiveness with respect to torque variations with a frequency proportional to the rotational velocity, such as a torque ripple, decreases, error other than the harmonic components decrease, and the accuracy of extracting the error increases. Accordingly, when extracting the harmonic components, it is effective to make the rotational velocity of the motor greater than in the case of not extracting the harmonic components. Furthermore, if the drive current of the motor is large, the SN ratio of the current increases, and the efficiency of extracting the error caused by the harmonic components increases. Accordingly, when extracting the harmonic components, it is effective to make the drive current of the motor greater than in the case of not extracting the harmonic components. That is, when extracting the harmonic components, it is effective to perform extraction with the torque of the motor made greater than in the case of not extracting the harmonic components. Furthermore, upon averaging the data of multiple instances, the influence of error with no periodicity can be reduced. Accordingly, a configuration is used in which the harmonic components are extracted over multiple rotations of the rotor, the error is obtained based on the average value of the harmonic components at the same rotational position of the rotor, and the error is reduced. As a result, the influence of error with no periodicity can be reduced.

Figure 10:
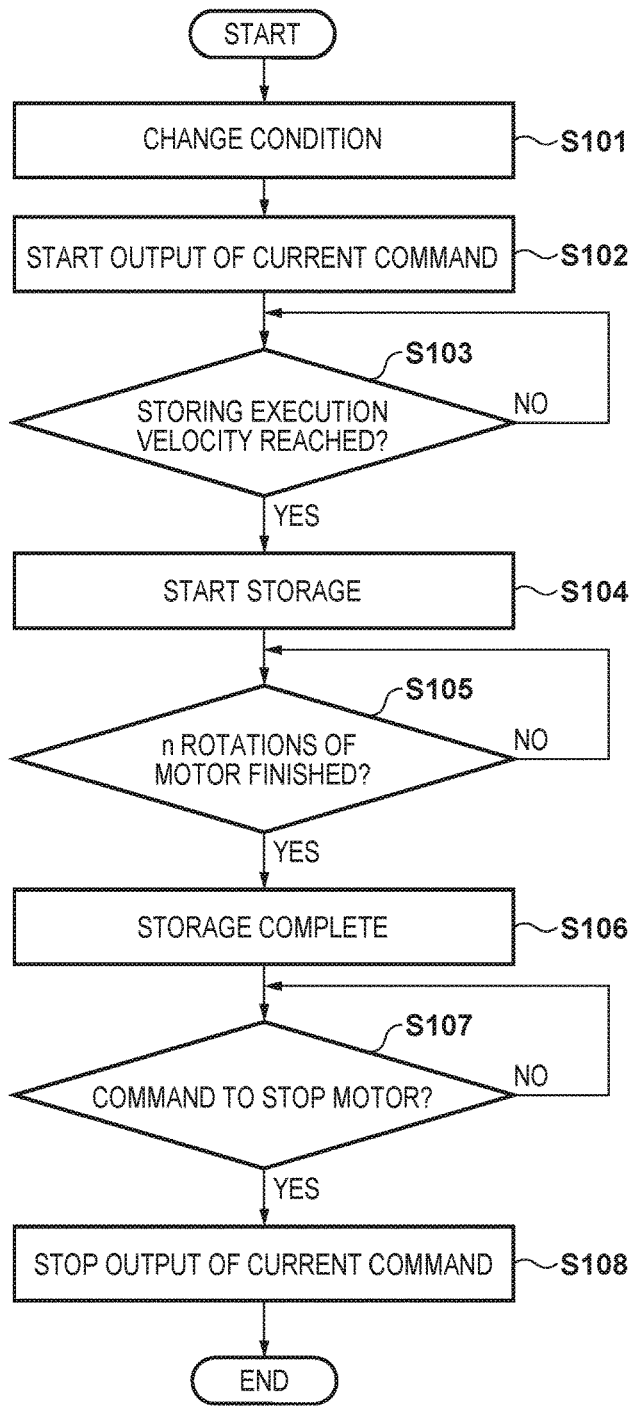
FIG. 10 is a flowchart of processing for performing storage in a storage unit according to an embodiment.

Next, an operation flow of the motor control apparatus will be described. FIG. 10 is a flowchart showing a method in which the storage unit 354 stores the error caused by the harmonic components. The motor control apparatus starts the processing of FIG. 10 when the storage operation is commanded by the CPU 100. Note that before the storage operation is commanded, the current command is not output from the current command generation unit 42 and the motor is stopped.

When the storage operation is commanded by the CPU 100, in step S101, the motor control apparatus sets the above-described conditions, such as the control gain and the torque, to predetermined conditions suitable for extracting the harmonic components. In step S102, the current command generation unit 42 performs output of the current command value and the motor rotates. When the rotational velocity of the motor reaches the storing execution velocity in step S103, the storage unit 354 starts storage of the error caused by the harmonic components in step S104. Note that as described above, the storage unit 354 stores the error caused by the harmonic components based on a position signal output by the synchronization signal generation unit 355. Thereafter, in step S105, when the motor rotates a predetermined number of times n, in step S106, the storage unit 354 ends the storage operation. Note that the number of rotations needed for the storage operation need only be determined according to the frequency of the harmonic to be removed, and need only be at least one or more electrical angle rotation. After the storage operation ends, when the CPU 100 gives an instruction to stop the motor in step S107, the current command generation unit 42 stops the output of the current command value in step S108, and the motor stops.

Figure 11:
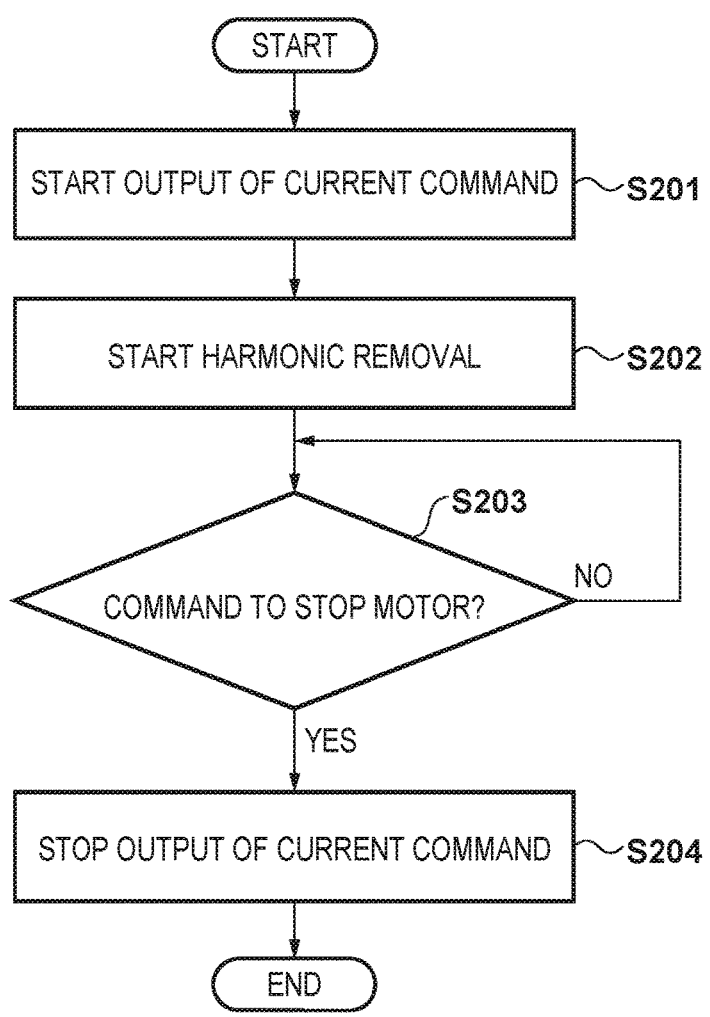
FIG. 11 is a flowchart of motor control processing according to an embodiment.

FIG. 11 is a flowchart showing a method in which the motor control apparatus controls the motor by reducing the error included in the estimated velocity Vel_est based on the error caused by the harmonic components stored in the storage unit 354. When the command to start the rotation of the motor is output from the CPU 100, in step S201, the current command generation unit 42 outputs the current command value and the motor rotates. In step S202, the harmonic removal unit 357 obtains the estimated velocity Vel_out by correcting the estimated velocity Vel_est based on the error caused by the harmonic components output from the storage unit 354. Then, the drive voltage generation unit 4 generates a voltage for driving the motor based on the estimated velocity Vel_out. After that, in step S203, velocity control is performed until a motor stop command is output from the CPU 100. In step S203, when the motor stop command is output from the CPU 100, the current command generation unit 42 stops the output of the current command value in step S204 and the motor stops. As described above, by reducing the error caused by the harmonic components, it is possible to reduce rotational misalignment, vibration, and noise at the time of a rotation operation of the motor.

Note that a configuration may be used in which the storage unit 354 stores the error caused by the harmonic components only at a time of assembly at a factory or at a time of starting up the motor control apparatus. Also, a configuration is possible in which the storage operation is carried out every time the power is turned on, and a configuration is possible in which the storage operation is carried out every time the rotation of the motor is started.

According to the above description, motor control with reduced rotational misalignment, vibration, and noise can be performed by the velocity FF control unit 35 reducing the error included in the estimated velocity.

Second Embodiment

Figure 12:
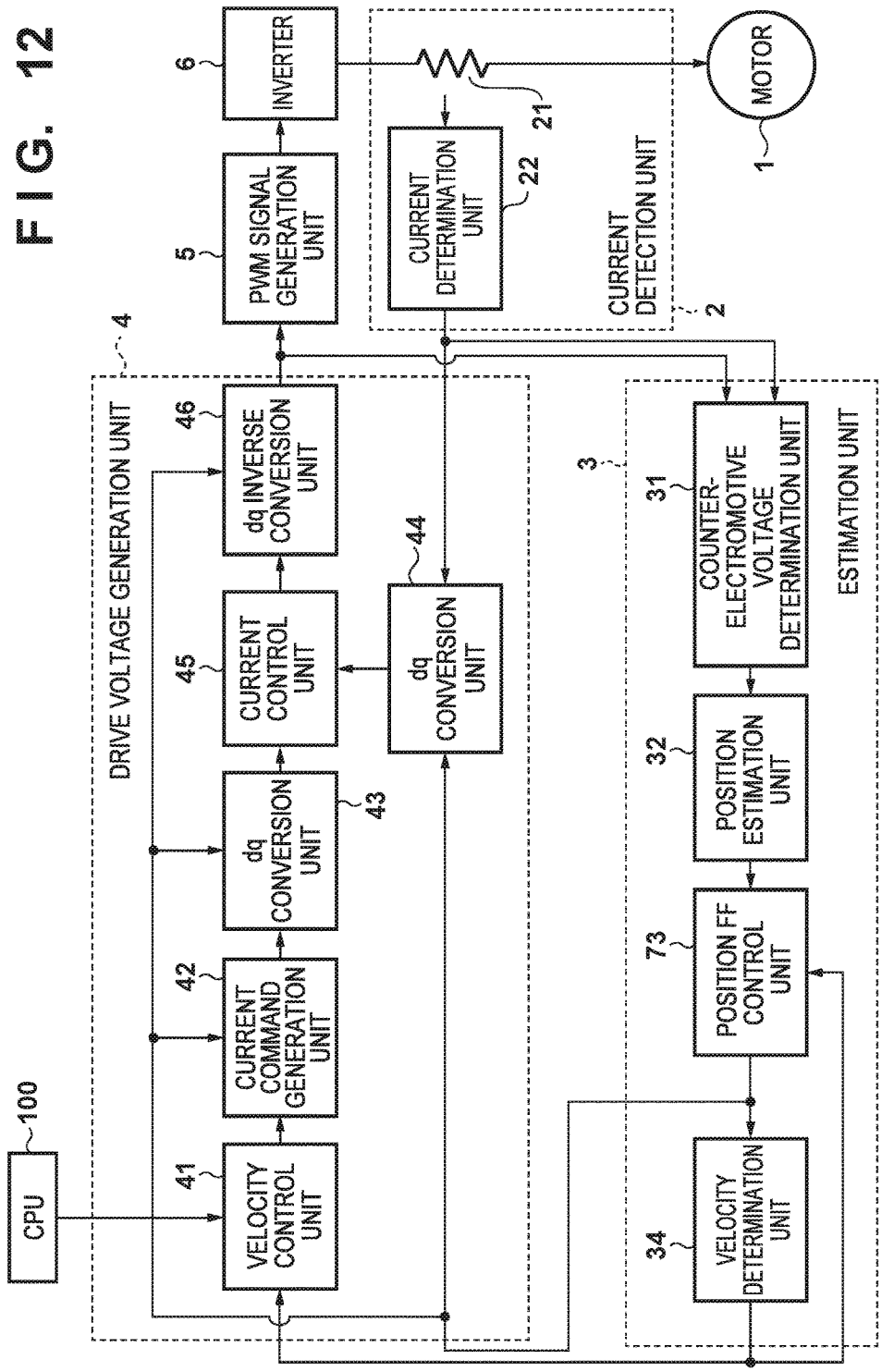
FIG. 12 is a diagram showing a configuration of a motor control apparatus according to an embodiment.

Next, a second embodiment will be described with a focus on points that differ from the first embodiment. FIG. 12 is a diagram showing a configuration of a motor control apparatus according to the present embodiment. The configuration of the estimation unit 3 differs from that of the first embodiment, and hereinafter, the estimation unit 3 shown in FIG. 12 will be described. In the estimation unit 3 of the present embodiment shown in FIG. 12, the counter-electromotive voltage determination unit 31 and the position estimation unit 32 are similar to those in the first embodiment shown in FIG. 1, and thus, the position estimation unit 32 outputs an estimated position θ_est. The position FF control unit 73 reduces the error caused by the harmonics included in the estimated position θ_est and outputs the estimated position θ_out resulting from the error reduction to the velocity determination unit 34. The processing performed by the velocity determination unit 34 is similar to that of the first embodiment. However, the velocity determination unit 34 of the present embodiment obtains the estimated velocity based on the estimated position θ_out with the reduced error, and therefore outputs the estimated velocity Vel_out with the reduced error. Note that as shown in FIG. 12, the estimated velocity Vel_out is input to the position FF control unit 73 as well.

Figure 13:
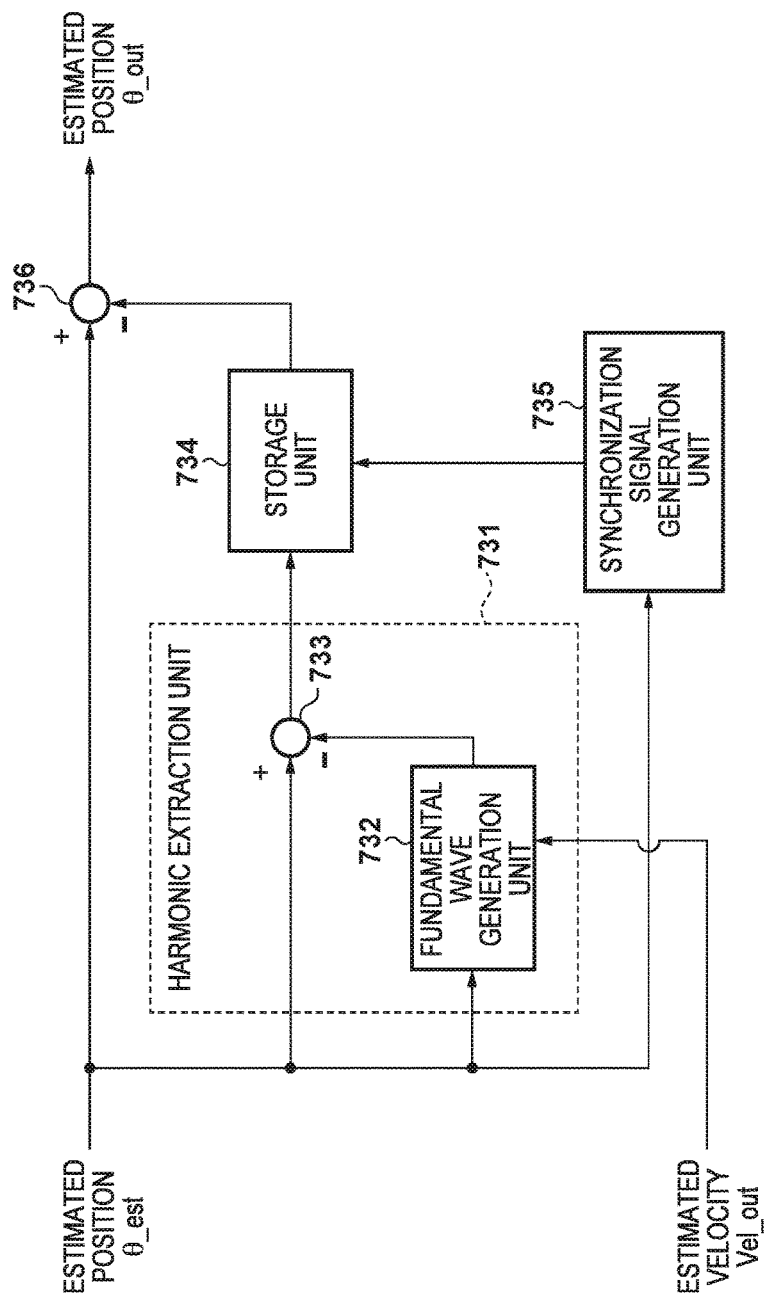
FIG. 13 is a diagram showing a configuration of a position FF control unit according to an embodiment.

FIG. 13 is a diagram showing a configuration of the position FF control unit 73 according to the present embodiment. A fundamental wave generation unit 732 of a harmonic extraction unit 731 outputs the average value of both the rotational position obtained based on the estimated velocity Vel_out and the estimated position θ_est as the fundamental wave. Note that it is also possible to use a configuration in which the average value of the estimated velocity Vel_out is obtained and the rotational position is obtained based on the average value. A subtractor 733 extracts the harmonic components included in the estimated position θ_est by subtracting the average value output by the fundamental wave generation unit 732 from the estimated position θ_est. The subsequent processing performed by the storage unit 734, the synchronization signal generation unit 735, and the harmonic removal unit 736 is similar to that of the first embodiment.

Figure 14:
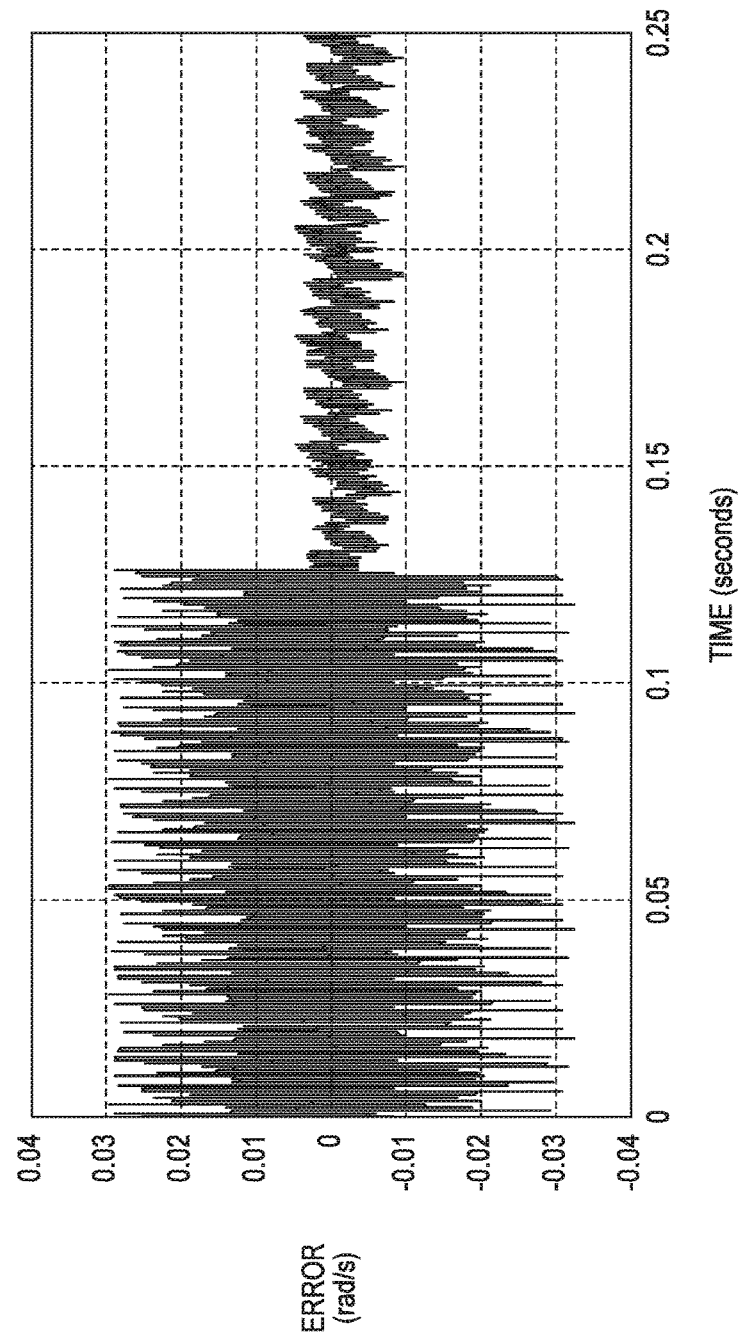
FIG. 14 is a diagram showing an error reduction effect according to an embodiment.

FIG. 14 is a diagram showing an effect of the position FF control unit 73. The operation of the position FF control unit 73 is stopped from 0 seconds to 0.125 seconds, and the position FF control unit 73 is allowed to operate from 0.125 seconds to 0.25 seconds. According to FIG. 14, it can be understood that it is possible to reduce the error caused by the harmonic components included in the estimated position using the position FF control unit 73. In the present embodiment, the velocity determination unit 34 determines the rotational velocity based on the estimated position resulting from error reduction, and thus, it is possible to obtain the rotational velocity with reduced error caused by the harmonic components in the counter-electromotive voltage.

Note that as described above, the amplitude of the error caused by the harmonic components of the counter-electromotive voltage included at the estimated position do not change according to the rotational velocity of the motor. Accordingly, the error caused by the harmonic components stored in the storage unit 734 need only be measured one time at any rotational velocity, and the error in the estimated position at any rotational velocity can be reduced using the error caused by the harmonic components stored in the storage unit 734.

According to the above description, the error included in the estimated position and the estimated velocity can be reduced by the position FF control unit 73. By using an estimated velocity with little error, it is possible to reduce rotational misalignment, vibration, and noise in the motor. Also, by using an estimated position with little error, it is possible to prevent a decrease in efficiency caused by phase shift and the like in the current command for when the drive voltage generation unit 4 controls the motor.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-180113, filed on Sep. 11, 2015, and No. 2016-144754, filed on Jul. 22, 2016, which are hereby incorporated by reference herein in their entirety.

What is claimed is:

1. A motor control apparatus comprising:
   a counter-electromotive voltage determiner configured to determine a counter-electromotive voltage that is generated in a winding of a motor;
   a position determiner configured to determine a rotational position of a rotor of the motor based on the counter-electromotive voltage determined by the counter-electromotive determiner;
   a velocity determiner configured to determine a first velocity, which is a rotational velocity of the rotor, based on a change amount of the rotational position in a predetermined period;
   a controller configured to (i) calculate an average value of a plurality of first velocities determined by the velocity determiner in a state where the motor is controlled so that the rotor rotates with a predetermined velocity, (ii) calculate a difference value between the average value and one of the plurality of first velocities, and (iii) control a driving current flowing in the winding of the motor based on both the difference value and the first velocity determined by the velocity determiner;
   a memory configured to store the difference value calculated by the controller; and
   a corrector configured to obtain a second velocity by correcting the first velocity based on the difference value stored in the memory,
   wherein the controller performs feedback control in which the driving current is controlled so that a deviation between an instructed velocity indicating a target velocity of the rotor of the motor and the second velocity is reduced.

2. The motor control apparatus according to claim 1, wherein
   the controller calculates the difference value by subtracting the average value from one of the plurality of first velocities.

3. The motor control apparatus according to claim 1, wherein
   the corrector obtains the second velocity by correcting the difference value according to the first velocity and subtracting the corrected difference value from the first velocity.

4. The motor control apparatus according to claim 1, wherein
   the first velocity and the difference value are associated with each rotational position determined by the position determiner, and
   the corrector corrects the first velocity based on the difference value associated with each rotational position.

5. The motor control apparatus according to claim 4, wherein
   the memory stores the difference value in association with each rotational position determined by the position determiner, and
   the corrector corrects the first velocity based on the difference value stored in the memory.

6. The motor control apparatus according to claim 5, wherein
   an average value of difference values corresponding to the same rotational position is stored in the memory.

7. The motor control apparatus according to claim 6, wherein
   a control gain of the feedback control when calculating the average value and the difference value is smaller than a control gain of the feedback when controlling current flowing in the winding of the motor.

8. The motor control apparatus according to claim 6, wherein
   the predetermined velocity when calculating the average value and the difference value is greater than a rotational velocity when controlling current flowing in the winding of the motor.

9. The motor control apparatus according to claim 6, wherein
   a drive current provided to the motor when calculating the average value and the difference value is made larger than the drive current provided to the motor when controlling current flowing in the winding of the motor.

10. A motor control apparatus comprising:
    a counter-electromotive voltage determiner configured to determine a counter-electromotive voltage that is generated in a winding of a rotor of the motor;
    a position determiner configured to determine a first position, which is a rotational position of a rotor, based on the counter-electromotive voltage determined by the counter-electromotive voltage determiner;
    a controller configured to (i) calculate an average value of a plurality of first positions determined by the position determiner in a state where the rotor rotates with a predetermined velocity, (ii) calculate a difference value between the average value and one of the plurality of first positions, and (iii) control a driving current flowing in the winding of the motor based on the difference value;
    a memory configured to store the difference value calculated by the controller;
    a corrector configured to obtain a second position by correcting the first position based on the difference value stored in the memory; and
    a velocity determiner configured to determine a rotational velocity of the rotor based on a change amount of the second position in a predetermined period, wherein the controller controls the driving current so that a deviation between an instructed position indicating a target position of the rotor of the motor and the second position is reduced.

11. The motor control apparatus according to claim 10, wherein
    the controller calculates the difference value by subtracting, from one of the plurality of first positions, an average value of both the first position and a rotational position obtained based on the rotational velocity determined by the velocity determiner.

12. The motor control apparatus according to claim 10, wherein
    the memory stores the difference value in association with each first position, and
    an average value of difference values corresponding to the same rotational position is stored in the memory.

13. The motor control apparatus according to claim 10, wherein
    the memory stores the difference value in association with each first position,
    the controller controls the driving current based on feedback, and
    a control gain of the feedback control when calculating the average value and the difference value is smaller than a control gain of the feedback control when controlling current flowing in the winding of the motor.

14. The motor control apparatus according to claim 10, wherein the memory stores the difference value in association with each first position, and the predetermined velocity when calculating the average value and the difference value is greater than the rotational velocity when controlling current flowing in the winding of the motor.

15. The motor control apparatus according to claim 10, wherein the memory stores the difference value in association with each first position, and the driving current provided to the motor when calculating the average value and the difference value is larger than the driving current provided to the motor when controlling current flowing in the winding of the motor.

\* \* \* \* \*